United States Patent [19]

Teller

[11] 3,919,392
[45] Nov. 11, 1975

[54] ABATEMENT AND SELECTIVE RECOVERY OF ACID GAS EMISSIONS

[75] Inventor: Aaron Joseph Teller, Westboro, Mass.

[73] Assignee: Teller Environmental Systems, Inc., Worcester, Mass.

[22] Filed: Apr. 25, 1974

[21] Appl. No.: 463,653

Related U.S. Application Data

[63] Continuation-in-part of Ser. No. 243,147, April 12, 1972, abandoned.

[52] U.S. Cl. ............... 423/240; 423/242; 423/642; 423/643
[51] Int. Cl.² ......................................... B01D 53/34
[58] Field of Search ........... 423/240, 241, 242, 642, 423/643; 55/90

[56] References Cited
UNITED STATES PATENTS

| | | | |
|---|---|---|---|
| 1,271,899 | 7/1918 | Howard et al. | 423/242 |
| 1,851,418 | 3/1932 | Buchner | 423/643 |
| 2,813,000 | 11/1957 | Quittenton | 423/240 |
| 3,324,630 | 6/1967 | Teller et al. | 55/90 |
| 3,514,283 | 5/1970 | Griffith | 423/234 |

*Primary Examiner*—Earl C. Thomas
*Attorney, Agent, or Firm*—Thompson, Birch, Gauthier & Samuels

[57] ABSTRACT

A process for the selective removal of hydrogen fluoride and sulfur dioxide from a gas stream is shown. The gas stream is passed through two crossflow sorption zones in series and is contacted therein with separate aqueous solutions of a basic material. In the first sorption zone the pH of the solution and the temperature of the gas stream are so maintained that only the hydrogen fluoride is removed. The soluble salt which forms is then reacted with calcium hydroxide to form insoluble calcium fluoride which is removed from the system; and the hydroxide solution is recycled to the first sorption zone. In the second sorption zone the gas stream from which the hydrogen fluoride has been removed is contacted with a second aqueous solution of a basic material under conditions conducive to the formation of the corresponding soluble sulfite salt. The solution of sulfite is then reacted with calcium hydroxide to form insoluble calcium sulfite which is recovered. The remaining aqueous solution of hydroxide is recycled to the second sorption zone.

9 Claims, 1 Drawing Figure

ABATEMENT AND SELECTIVE RECOVERY OF ACID GAS EMISSIONS

CROSS REFERENCE TO RELATED APPLICATIONS

This application is a continuation-in-part of U.S. Pat. application Ser. No. 243,147 filed Apr. 12, 1972, and now abandoned.

BACKGROUND OF INVENTION

This invention relates to a process for the abatement and selective removal of acid gases from industrial gas streams. More specifically, this invention relates to a process for the separate removal of hydrogen fluoride, HF, and sulfur dioxide, $SO_2$, from industrial gaseous effluents containing these components. Even more specifically, this invetnion relates to a process for recovering hydrogen fluoride and sulfur dioxide from the gases formed in the manufacture of aluminum by electrolysis of molten alumina or in glass manufacture, wherein a gaseous mixture comprising these components is contacted with certain liquid sorbing media.

The processes of this invention are particularly useful in the recovery of the acid gases hydrogen fluoride and sulfur dioxide from the waste gases produced in the manufacture of aluminum by electrolytic processes. The gases formed in these processes cannot be permitted to escape into the environment as they are hazardous to plant personnel and pose a significant danger to plant and animal life in the area. Furthermore, the regulatory agencies of both federal and state governments have, in recent years, reduced the permissible levels of such gases in plant effluents. Still further, hydrogen fluoride and sulfur dioxide are useful by-products if recovered and such recovery can improve the overall economy of an industrial process.

In view of the danger in permitting the acid gases to escape and the economic loss to the process in not recovering them, efforts have been made to remove and selectively recover these components from industrial off gases. Several processes have been developed which include the scrubbing of the off gases with media which selectively react with one or more of the components of the gas stream. These techniques are expensive, however, as a separate reagent must be used for each of the gases that is to be recovered. Other processes for the selective removal of acid gases include those wherein the gas is passed over a solid which selectively reacts with or adsorbs the acid gases from the waste stream. These processes have the disadvantages of requiring special and often expensive solid chemicals which need to be replaced or regenerated from time to time.

One inexpensive solution is to sorb the acid gases into a slurry containing a cheap base such as lime (CaO). However, it has been found that such a system plugs at a pH greater than 4 because of the insoluble reaction products formed. On the other hand, it is prohibitively expensive to use bases such as sodium hydroxide which form soluble reactions products with acid gases to effect the removal of the gases even though the system does not plug, unless the sodium hydroxide can be regenerated for reuse.

OBJECTS OF INVENTION

It is thus the primary object of this invention to provide a process for selectively removing acid gas components from a gas stream in a process which requires a relatively small capital investment and low operating expenditures.

It is a further, more specific object of this invention to provide a process for selectively removing hydrogen fluoride and sulfur dioxide from waste gas streams by a technique which can employ a single liquid sorption medium and relatively uncomplicated apparatus.

It is still a further object of this invention to recover hydrogen fluoride and sulfur dioxide from waste gas streams in an efficient, integrated chemical process which permits the economical recycle and reuse of process streams and avoids the problems of regeneration of solid adsorbants and the attendant down time and processing inefficiencies which result therefrom.

SUMMARY OF INVENTION

The objects of this invention are achieved by passing the gas stream containing the acid gases through at least two sorption zones in series. A preferred means for carrying out this process is by the use of two scrubbing beds in a crossflow liquid scrubbing process such as that disclosed in U.S. Pat. No. 3,324,630, and that disclosure is incorporated herein by reference. The conditions in each sorption zone or scrubbing bed are adjusted to selectively remove the respective acid gas components without interfering with or affecting the balance of the gas mixture. Thus, the gas mixture is passed through a first sorption zone and is contacted therein with a first aqueous solution of a basic material selected from the group consisting of sodium hydroxide, potassium hydroxide, sodium carbonate, potassium carbonate and mixtures thereof. The rate of addition of basic material is controlled so that the pH of the liquid effluent from the first sorption zone is maintained at a value not greater than 6. This effects the removal of hydrogen fluoride which is sorbed into the first sorption or scrubbing liquid as a soluble fluoride salt. The typical reaction where the basic material is sodium hydroxide is:

$$HF + Na^+ + OH^- \rightarrow Na^+ + F^- + H_2O.$$

The remaining gas mixture, from which the hydrogen fluoride has been removed, is then passed through a second sorption zone and is contacted therein with a second aqueous solution of one of the basic compounds listed above. The rate of addition of basic material is controlled this time so that the pH of the solution effluent from the second sorption zone is maintained in the range of from 6 to 13. The sulfur dioxide is thereby removed from the gas stream as water-soluble sulfite and is carried from the sorption zone in the solution effluent. The typical reaction is:

$$SO_2^= + 2Na^+ + 2OH^- \rightarrow 2Na^+ + SO_3^- + H_2O.$$

The liquid effluents from the first and second sorption zones, which contain in solution respectively the soluble fluoride salt and the soluble sulfite salt, are then reacted in separate reaction vessels with calcium hydroxide. Calcium fluoride and calcium sulfite, respectively, are formed. These compounds, which are insoluble, precipitate in the reaction vessel and may be separated from the liquid effluents by any of a number of conventional techniques such as filtration, centrifugation, etc. What remains after separation of the solids are clear solutions of an alkali hydroxide which are then recycled, respectively, to the two sorption zones. Additional amounts of the basic material may be added to the recycle solutions to maintain the pH of the sorption or scrubbing liquids at the desired levels for proper pH control as described above.

In the removal of hydrogen fluoride from a mixture of gases, it has been found that the temperature of the gas in the first sorption zone should not be higher than 100°F. if very low emissions of HF in the range of 0–3 ppm. are desired. Depending on the amount of hydrogen fluoride to be removed and the temperature of the gas stream, this may necessitate cooling the recycle hydrogen solution. Alternatively, the sorption zone itself may be cooled by conventional cooling equipment to remove the heat of contact, reaction and sorption.

In separating hydrogen fluoride from sulfur dioxide, it is preferred to use a solution of sodium hydroxide as the sorption or scrubbing liquid. Hydrogen fluoride reacts with the sodium hydroxide as illustrated above and passes into the aqueous solution in the form of sodium fluoride. The dissolved sodium fluoride reacts with calcium hydroxide in a separate reaction vessel to form insoluble calcium fluoride while regenerating the sodium base according to the following equation:

$$2Na^+ + 2F^- + Ca(OH)_2 \rightarrow CaF_2 \downarrow + 2Na^+ + 2OH^-.$$

The pH of the effluent from the first sorption zone is maintained at a level not greater than 6, permitting the gas stream containing sulfur dioxide to pass through the first sorption zone without being sorbed.

The pH of the solution effluent from the second sorption zone is maintained at a pH of from 6 to 13, and again sodium hydroxide is preferred as the basic material. In the second sorption zone the sulfur dioxide reacts to form soluble sodium sulfite and this solution is then reacted with calcium hydroxide to precipitate insoluble calcium sulfite and regenerate the sodium hydroxide according to the following equation:

$$2Na^+ + SO_3^= + Ca(OH)_2 \rightarrow CaSO_3 \downarrow + 2Na^+ + 2OH^-.$$

DESCRIPTION OF DRAWING

In FIG. 1, a gas stream $S_1$, for example from an incinerator stack of an aluminum electrolysis furnace, is directed by conduit 12 into crossflow scrubbing unit 14 which includes first scrubbing bed 16 and second scrubbing bed 18. Scrubbing beds 16 and 18 operate on the crossflow principle as disclosed in the aforementioned U.S. Pat. No. 3,324,630 and may be packed with a suitable packing such as "Tellerettes" as disclosed in U.S. Pat. No. 2,867,425. Although scrubbing beds 16 and 18 may also be arranged to operate countercurrently, the efficiency of this process is significantly improved by crossflow operation. A first aqueous solution of a basic material such as sodium hydroxide is introduced via conduit 20 to the upper part of first scrubbing bed 16. The basic solution tends to neutralize acid gases in the gas stream $S_1$, but by controlling the proportion of basic material to acid in the first scrubbing bed such that the pH in the bed is never permitted to rise above about 6, only hydrogen fluoride is removed from the gas stream at this point. The scrubbing liquid with fluoride salt dissolved therein passes from scrubbing bed 16 through support screen 17 into collection chamber 19 and then via conduit 22 to a reaction vessel 24 equipped with stirrer 26. Calcium hydroxide in the form of a finely-divided solid or a concentrated aqueous slurry is introduced to vessel 24 via conduit 28, and the calcium hydroxide reacts with the dissolved fluoride salt to precipitate insoluble calcium fluoride and regenerate the basic hydroxide solution for recirculation to the scrubbing bed.

Figure 1:
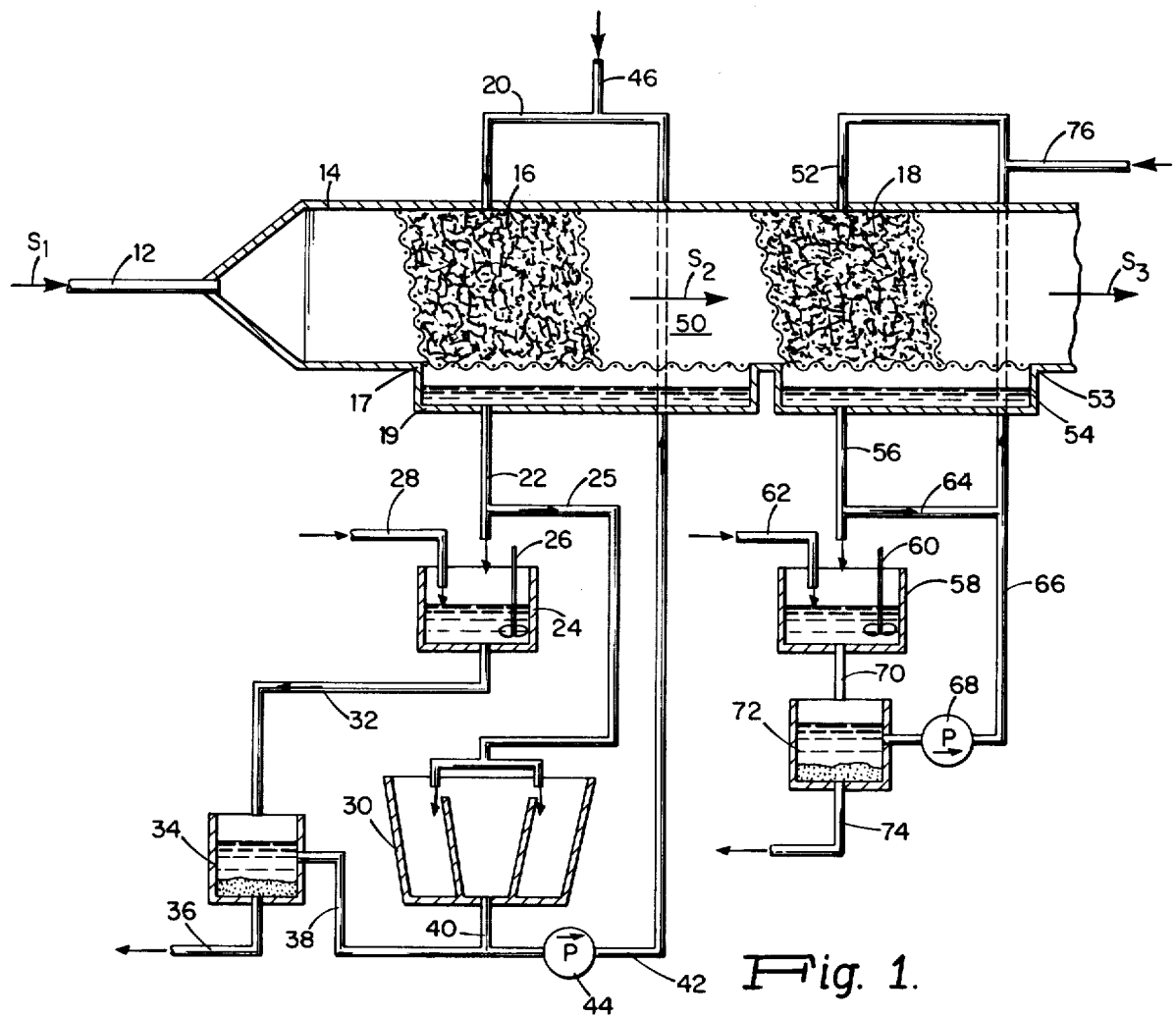
FIG. 1 is a schematic diagram of the process of this invention.

The easiest way of carrying out this procedure for regenerating the basic hydroxide solution is to simply direct all of the liquid effluent from the first scrubbing bed via conduit 22 to reaction vessel 24 and to introduce calcium hydroxide via conduit 28 at a rate which is a stoichiometric equivalent or a slight excess based on the rate at which hydrogen fluoride is being removed from the gas stream $S_1$ in scrubbing bed 16. However, it has been found that this procedure may result in plugging scrubbing bed 16 because of the residual calcium content in the recycle liquid which precipitates calcium fluoride in the scrubber. In particular, the residual calcium content in the recycle liquid has been found to be controlled by the solubility product constant, $K_{sp}$, for calcium fluoride according to the following equation:

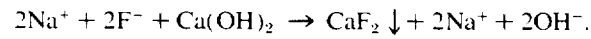

$$K_{sp} = [Ca^{++}][F^-]^2$$
$$= 3.4 \times 10^{-11} \quad \text{(at 18°C, when [Ca}^{++}\text{] and [F}^-\text{] are expressed in g. mols./l.)}$$

Accordingly, when the complete liquid effluent from scrubbing bed 16 is neutralized by calcium hydroxide to equivalence, the concentration of calcium (in gram-mols./l.) equals one-half the concentration of fluoride, and the residual concentration of calcium in the recycle liquid is calculated as follows:

$$[Ca^{++}] \quad [\tfrac{1}{2}Ca^{++}]^2 = 3.4 \times 10^{-11}$$
$$\tfrac{1}{4}[Ca^{++}]^3 = 3.4 \times 10^{-11}$$
$$[Ca^{++}] = 5.13 \times 10^{-4} \text{ gr. mols./l.}$$

This is a relatively high residual calcium content, and when the recycle stream return to scrubbing bed 16 to sorb fresh hydrogen fluoride, almost all of this calcium is precipitated in the scrubber as $CaF_2$ thereby causing plugging of the unit.

It has now been found possible to virtually eliminate this precipitation and plugging by a novel two-step process for reducing the residual calcium concentration in the recycle liquid. The process comprises the steps of: 1) diverting a large portion of the liquid effluent leaving the scrubbing bed from the reaction vessel and passing only a slip stream into the reaction vessel for reaction with calcium hydroxide; and, 2) neutralizing only a portion of the slip stream actually introduced into the reaction vessel. This variation of the basic process is carried out, as illustrated in FIG. 1, by diverting a large portion such as 50–95 percent of the liquid effluent from scrubbing bed 16 around reaction vessel 24 via conduit 25. The remaining portion of the liquid effluent passes via conduit 22 as a slip stream into reaction vessel 24, as described above; however, the rate of addition of calcium hydroxide to reaction vessel 24 via conduit 28 is controlled such that only a portion of the fluoride content of the slip stream, for example 50–90 percent, is actually neutralized. The relatively high residual concentration of fluoride ion thus maintained in the solution inhibits the calcium ion from going into solution. This effect is particularly dramatic because of the fact that the concentration of calcium ion is inversely proportional to the square of the concentration of fluoride ion as illustrated by the equation:

$$[Ca^{++}] = \frac{K_{sp}}{[F^-]^2}.$$

Thus, increasing the fluoride ion concentration by a factor of 10 reduces the residual calcium ion in the recycle liquid by a factor of 100.

Moreover, by diverting a large portion of the scrubbing liquid from the reaction vessel altogether, the concentration of calcium ion in the final recycle liquid is reduced still further. As shown in FIG. 1, the diverted portion of the liquid effluent in conduit 25 is passed through a cooling tower 30. A cooling tower, which may be of any conventional design, or other conventional cooling means such as shell and tube heat exchangers, is generally necessary to cool the liquid effluent from scrubbing bed 16 if it has been heated by contact with gas stream $S_1$ so that the recycled liquid does not exceed a temperature of about 100°F. As previously explained, a scrubbing liquid temperature of less than about 100°F. is one of the required conditions for preferentially separating hydrogen fluoride from gas stream $S_1$ in the first scrubbing bed.

Meanwhile, the slip stream, containing fluoride which has been partially neutralized by the addition of calcium hydroxide, is removed from reaction vessel 24 via conduit 32 and directed into settling chamber 34 for effecting the separation of solids, i.e. precipitated $CaF_2$ and unreacted $Ca(OH)_2$, and liquid. Solids are periodically or continuously withdrawn from the chamber via conduit 36 while the liquid containing residual calcium ion, fluoride ion and regenerated hydroxide is withdrawn via conduit 38 and mixed with the unreacted liquid effluent coming from cooling tower 30 via conduit 40. In place of settling chamber 34 there may be used any conventional means for the separation of liquids and particulates such as a filter screen or a centrifuge.

As previously discussed, the mixing of the slip stream in conduit 38 containing residual calcium ion and the large portion of the cooled liquid effluent in conduit 40 results in still further reducing the concentration of calcium in the recycle liquid. Thus, for example, if the slip stream is at a rate of 100 gpm. and the mixed stream is at a rate of 1,000 gpm., the concentration of calcium in the mixed recycle stream carried via conduit 42 is further reduced by a factor of 10.

A pump 44 is used to recycle the mixed liquid through conduit 42 back to the top of scrubbing bed 16. Optionally, if necessary, supplementary basic material may be added to the recycle liquid via conduit 46, and the final recycled liquid is returned to conduit 20 for recycling through scrubbing bed 16.

The gas stream $S_2$ leaving scrubbing bed 16 passes through an open drainage zone 50 to remove excess liquid droplets entrained in the gas stream and then to scrubbing bed 18 wherein it is contacted by a second aqueous solution of a basic compound, such as sodium hydroxide. This second solution enters crossflow scrubbing bed 18 via conduit 52. The sulfur dioxide in the gas is sorbed into the basic solution as sulfite salt and the liquid effluent containing the soluble sulfite salt drains from scrubbing bed 18 through support screen 53 and into collection chamber 54. The liquid effluent then passes via conduit 56 to reaction vessel 58 equipped with stirrer 60 wherein it is reacted with calcium hydroxide introduced as a finely-divided solid or concentrated aqueous slurry via conduit 62. The calcium hydroxide reacts with the dissolved sulfite salt to precipitate insoluble calcium sulfite and regenerate the basic hydroxide solution for recirculation to the scrubbing bed.

As in the first stage of this process for fluoride removal, the easiest way to carry out this procedure for regenerating the basic hydroxide solution from the sulfite solution is to simply direct all of the liquid effluent from the second scrubbing bed via conduit 56 to reaction vessel 58 and to introduce calcium hydroxide via conduit 62 at a rate which is a stoichiometric equivalent or a slight excess based on the rate at which sulfur dioxide is being removed from the gas stream $S_2$ in scrubbing bed 18. However, as in the case of fluoride removal, it has been found that such a procedure may result in plugging scrubbing bed 18 because of the residual calcium content in the recycle liquid which precipitates calcium sulfite in the scrubber. The residual calcium content in the recycle liquid is controlled by the solubility product constant for calcium sulfite according to the equation:

$$K_{sp} = [Ca^{++}] [SO_3^=]$$

By the combination of diverting a large portion of the liquid effluent from reaction vessel 58 and neutralizing only a portion of the slip stream actually introduced into the reaction vessel, the residual calcium concentration in the recycle stream is dramatically reduced thereby obviating the scrubber precipitation and plugging problem.

More specifically, this variation of the basic process is carried out by diverting a large portion such as 50–90 percent of the liquid effluent from scrubbing bed 18 around reaction vessel 58 via conduit 64. In this case because it is generally unnecessary to cool the recycle liquid, the liquid effluent in conduit 64 can be passed directly into the recycle conduit 66 which is equipped with pump 68 to recycle the liquid back to the top of scrubbing bed 18. The remaining portion of the liquid effluent passes via conduit 56 as a slip stream into reaction vessel 58. The rate of addition of calcium hydroxide to reaction vessel 58 via conduit 62 is controlled such that only a portion of the sulfite content of the slip stream, for example 50–90 percent, is actually neutralized. The relatively high residual concentration of sulfite ion thus maintained in the solution inhibits the calcium ion from going into solution. This effect plus the dilution effect of remixing the slip stream and the main recycle stream so reduces the residual concentration of calcium ion that little precipitation occurs in the scrubber.

Meanwhile the slip stream, containing sulfite which has been partially neutralized, is removed from reaction vessel 58 via conduit 70 and directed into settling chamber 72 for effecting the separation of solids, i.e. precipitated $CaSO_3$ and unreacted $Ca(OH)_2$, and liquid. Solids are periodically or continuously withdrawn from the chamber via conduit 74 while the liquid containing residual calcium ion, sulfite ion and regenerated hydroxide is withdrawn via conduit 66 and mixed with the unreacted liquid effluent coming from conduit 64. In place of settling chamber 72 there may be used any conventional means for the separation of liquids and particulates such as a filter screen or a centrifuge. In recycling the mixed liquid, supplementary basic material may optionally be added to the recycle stream via conduit 76 to maintain the required pH level, and the final recycle liquid is returned to conduit 52 for recycling through scrubbing bed 18.

If desired, automatic sensing units may be installed in the recycle conduits 20 and 52 to sense the pH therein and signals therefrom may be transmitted to automatic flow controllers in conduits 46 and 76 respectively, to adjust the flow of the basic compound to the two systems to maintain the desired pH levels. Likewise, a temperature sensor may be positioned in drainage zone 50 to indicate the temperature therein and a signal from this temperature sensor may be transmitted to an automatic control for the operation of cooling tower 30 to adjust the amount of cooling therein and thereby maintain the desired temperature of the gas stream passing through scrubbing bed 16.

This invention is further described by the following examples.

EXAMPLE 1

7,000 cubic feet per minute of gas containing 300 ppm. hydrogen fluoride, 300 ppm. sulfur dioxide and 3% by volume carbon dioxide, at 150°F., saturated, were passed into a separation-recovery system similar to that shown in FIG. 1 except that there was no provision for diverting a portion of the scrubbing liquid effluents. It was desired to recover the hyrogen fluoride and sulfur dioxide separately and to permit the carbon dioxide to pass through the system. It was also desired to recover the hyrogen fluoride and sulfur dioxide so that they could be reused.

The above-described feed gas $S_1$ was passed into scrubbing bed 16 and was contacted therein with 350 gallons per minute of an aqueous solution of sodium hydroxide. The solution contained about 0.007 percent by weight sodium hydroxide and was at a temperature of 80°F. The pH of the solution was approximately 10. The hydrogen fluoride in the feed gas was sorbed into the hydroxide solution, and a solution of sodium fluoride was recovered in collection chamber 19. The effluent stream contained about 0.007 percent by weight sodium fluoride, NaF, and was at a temperature of 130°F. The total effluent stream was 355 gallons per minute and the pH was 6. The slight increase in liquid volume was the result of the condensation of water vapor from the gas stream. The solution effluent was then passed via conduit 22 into vessel 24 and was reacted therein with a stoichiometric equivalent of calcium hydroxide, $Ca(OH)_2$. The reaction of sodium fluoride with calcium hydroxide yielded calcium fluoride, $CaF_2$, which was removed by mechanical separation means. The solution remaining contained 0.007 percent by weight sodium hydroxide. This solution was then passed to a cooling tower and was cooled to about 80°F. It was then recycled to scrubbing bed 16. Any sodium hydroxide which was lost due to reaction inefficiency or mechanical losses was added to the recycle liquid via conduit 46 to maintain the pH of the solution effluent leaving scrubbing bed 16 at a value of about 6.

The gas mixture leaving scrubbing bed 16 was passed through open drainage zone 50 to scrubbing bed 18. The temperature of the gas stream $S_2$ was 100°F. and it contained about 1 ppm. hydrogen fluoride, 300 ppm. sulfur dioxide and 3 percent by volume carbon dioxide. This gas stream was contacted in scrubbing bed 18 with 350 gallons per minute of a second aqueous solution of sodium hydroxide containing about 0.009 percent by weight sodium hydroxide. The temperature of the solution was 100°F. and the pH of the solution was about 12. The sulfur dioxide was sorbed into the solution forming soluble sodium sulfite, and the effluent was recovered in collection chamber 54. The solution effluent contained about 0.009 percent by weight sodium sulfite, $Na_2SO_3$, and was at about 100°F. The pH of the solution effluent was about 8. The aforementioned solution effluent was passed into reaction vessel 58 and was reacted therein with calcium hydroxide, $Ca(OH)_2$, introduced via conduit 62. The calcium hydroxide reacted with the sodium sulfite precipitating insoluble calcium sulfite dihydrate, $CaSO_3.2H_2O$, which was removed from the solution by mechanical means and was removed from the system via conduit 74. By virtue of the reaction in vessel 58, the recycle solution contained about 0.009 percent by weight sodium hydroxide and this solution was recycled via line 66 to scrubbing bed 18. The gaseous effluent $S_3$ from scrubbing bed 18 contained about 1 ppm. hydrogen fluoride, 1 ppm. sulfur dioxide and 3 percent by volume carbon dioxide. The temperature of the gaseous effluent was about 100°F.

This data is more clearly illustrated in Table 1 below.

Table 1

| | Gas Conditions | | |
|---|---|---|---|
| | $S_1$ | $S_2$ | $S_3$ |
| Volume (cfm.) | 7000 | — | — |
| HF (ppm.) | 300 | 1 | 1 |
| $SO_2$ (ppm.) | 300 | 300 | 1 |
| $CO_2$ (% by vol.) | 3% | 3% | 3% |
| Temp. (°F.) | 150° (sat.) | 100° | 100° |

| | Liquid Conditions | |
|---|---|---|
| Scrubbing bed 16 | Inlet | Outlet |
| Flow rate (gpm.) | 350 | 355 |
| Temp. (°F.) | 80° | 130° |
| pH | 10 | 6 |
| Salt content (% by wt.) | .007% NaOH | .007% NaF |
| Scrubbing bed 18 | | |
| Flow rate (gpm.) | 350 | 350 |
| Temp. (°F.) | 100° | 100° |
| pH | 12 | 8 |
| Salt content (% by wt.) | 0.009% NaOH | .009% $Na_2SO_3$ | cfm. — cubic feet per minute
ppm. — parts per million by volume
gpm. — gallons per minute

EXAMPLE 2

It was desired to remove 138 lbs./hr. of fluoride ion [$F^-$] from a gas stream containing HF and $SO_2$ by the process of the present invention. When the process was carried out according to the procedure of Example 1, it was found that the high concentration of fluoride ion in the first scrubbing bed led to substantial precipitation of calcium fluoride in the bed and consequent plugging of the unit. To obviate this problem, a large portion of the liquid effluent from the first scrubbing bed 16 was diverted from reaction vessel 24 via conduit 25 as shown in FIG. 1, and the slip stream passed to the reaction vessel was only partially neutralized by the addition of calcium hydroxide.

In particular, scrubbing liquid at the rate of about 8000 gpm. was added to the first scubbing bed. Initially this consisted of a fresh aqueous solution of NaOH, but as the system reached steady-state conditions, the concentration of fluoride ion in the recycle stream gradually increased. At start up, one may select any convenient flow rate for the slip stream and the amount of the fluoride in the slip stream to be neutralized. Once approximately steady-state conditions are achieved, fine adjustments in these variables can be made to suit process requirements. In this example, at steady-state conditions the liquid effluent from the first scrubbing bed contained 1,842 ppm. by weight of [F$^-$] and the flow rate of the slip stream was 150 gpm. The residual fluoride content of the recycle liquid coming from the calcium hydroxide reaction vessel was selected as 200 ppm. by weight. The actual flow rate of the slip stream necessary to remove the desired 138 lbs./hr. of fluoride was computed as follows:

change in [F$^-$] = 1842 − 200
= 1642 ppm.

volume of slip stream in gpm. =

$$\frac{138 \text{ lbs. }[F^-]/\text{hr.}}{(60 \text{ min./hr.})(8.34 \text{ lbs./gal.})(1642 \text{ lbs.}[F^-]/1,000,000 \text{ lbs. solution})}$$
= 168 gpm.

Therefore, based on this computation, the flow rate of the slip stream was increased by 18 gpm. to a total of 168 gpm. Sufficient calcium hydroxide was added to the reaction vessel to neutralize 138 lbs./hr. of fluoride.

The residual calcium in the slip stream after the separation of solids was calculated as follows:

[F$^-$] = 200 ppm.
= 1.1 × 10$^{-2}$ g. mols./l.

$K_{sp}$ = [Ca$^{++}$][F$^-$]$^2$ = 3.4 × 10$^{-11}$ $$[Ca^{++}] = \frac{3.4 \times 10^{-11}}{(1.1 \times 10^{-2})^2}$$
= 3.22 × 10$^{-7}$ g. moles./l.
= 1.8 × 10$^{-5}$ lbs. [Ca$^{++}$]/min.
in slip stream The volume of the diverted stream was simply (8,000−168) = 7,832 gpm. and it contained 1,842 ppm. [F$^-$]. The diverted stream was cooled and mixed with the solids-free slip stream, containing 1.8 × 10$^{-5}$ lbs. [Ca$^{++}$]/min. Thus, the concentration of residual calcium in the mixed recycle stream going to scrubbing bed 16 was computed to be 1.2 × 10$^{-3}$ ppm. or:

[Ca$^{++}$]$_{in}$ = 3.0 × 10$^{-8}$ g. mols./l.

The rate of precipitation of CaF$_2$ in the scrubbing bed was then calculated as follows:

[F$^-$] in effluent scrubbing liquid = 1842 ppm.
= 9.7 × 10$^{-2}$ g. mols./l.

[Ca$^{++}$]$_{out}$ in effluent scrubbing liquid
= $K_{sp}$/[F$^-$]$^2$ $$= \frac{3.4 \times 10^{-11}}{(9.7 \times 10^{-2})^2}$$

= 3.6 × 10$^{-9}$ g. mols./l.
[Ca$^{++}$]$_{in}$ − [Ca$^{++}$]$_{out}$
= (3.0 × 10$^{-8}$) − (3.6 × 10$^{-9}$)
= 26.4 × 10$^{-9}$ g. mols./l. of CaF$_2$
precipitated in scrubbing bed
= 8.25 × 10$^{-3}$ lbs. CaF$_2$/hr. deposited in scrubbing bed If the same process were carried out without diverting a large portion of the liquid effluent from the scrubbing bed and neutralizing only a portion of the fluoride in the slip stream, the amount of calcium fluoride deposited in the scrubbing bed would be larger by a hundred times or more depending on the volume of scrubbing liquid actually used. In general, the amount of calcium fluoride deposited in the scrubbing bed under these conditions will vary directly with the volume of scrubbing liquid used because a larger volume of completely neutralized recycle liquid will carry a proportionately larger quantity of residual calcium. Therefore, it is desirable to use as little a volume of scrubbing liquid as possible when conducting this process without diversion of the effluent scrubbing liquid and partial neutralization of the slip stream. There are, of course, limits on how far the volume of scrubbing liquid can be reduced without adversely affecting the efficiency of fluoride recovery in the scrubbing bed. Moreover, for a lesser volume of scrubbing liquid to sorb the same amount of hydrogen fluoride from a gas stream it must contain a proportionately higher concentration of sodium hydroxide. However, at higher concentrations caustic solutions become highly corrosive to metals and tend to damage or shorten the useful life of the apparatus. In short, the lowest practical level of scrubbing liquid was found, for the process of the next example, to be about 150 gpm.

EXAMPLE 3

For purposes of comparing the rate of deposition of calcium fluoride in a scrubbing bed where there is no diversion of effluent scrubbing liquid and partial neutralization of the slip stream to the process of Example 2, a scrubbing liquid rate of 150 gpm. was selected to demonstrate the lowest obtainable rate of deposition under these circumstances. As discussed above, the selection of a flow rate twice as high would approximately double the rate of precipitation of CaF$_2$ in the scrubbing bed.

volume of scrubbing liquid = 150 gpm.
rate of removal of fluoride = 138 lbs./hr.
[F$^-$] in effluent scrubbing liquid
= 1842 ppm.
= 9.7 × 10$^{-2}$ g. mols./l.

The maximum calcium content of the effluent scrubbing liquid is:

[Ca$^{++}$]$_{out}$ = $K_{sp}$/[F$^-$]$^2$
$$= \frac{3.4 \times 10^{-11}}{(9.7 \times 10^{-2})^2}$$
= 3.6 × 10$^{-9}$ g. moles./l.

As calculated earlier, the residual calcium content in the recycle stream to the scrubbing bed where there has been complete neutralization with calcium hydroxide is:

[Ca$^{++}$]$_{in}$ = 5.13 × 10$^{-4}$ g. mols./l.
[Ca$^{++}$]$_{in}$ − [Ca$^{++}$]$_{out}$
= (5.13 × 10$^{-4}$) − (3.6 × 10$^{-9}$)
= 5.13 × 10$^{-4}$ g. mols./l. of CaF$_2$
precipitated in scrubbing bed
= 3 lbs. CaF$_2$/hr. deposited in scrubbing bed.

This example demonstrates that when the process of Example 2 is carried out without diverting a large portion of the effluent scrubbing liquid and partially neutralizing the slip stream, the result is a deposition rate more than 300 times greater than occurs when these steps are used.

The same procedure of diverting a large portion of the effluent scrubbing liquid and neutralizing only a portion of the slip stream is also applicable to and advantageous in the scrubbing of $SO_2$ from the gas stream. The effect in this case is not quite as dramatic as with $CaF_2$ because the residual concentration of calcium in the recycle liquid varies inversely with the concentration of sulfite ion taken only to the first power according to the relationship:

$$[Ca^{--}] = \frac{K_{sp} \text{ (for } CaSO_3\text{)}}{[SO_3^-]}$$

However, the principle here is still the same, and a surprising reduction in the incidence of plugging of scrubbing bed 18 has been found to result from the use of these procedures.

Having described the present invention, what is claimed is:

1. A process for the selective and separate removal of hydrogen fluoride and sulfur dioxide from a gaseous mixture comprising the steps of:
   a. passing said gaseous mixture through a first sorption zone in crossflow contact with a first aqueous solution of a basic compound selected from the group consisting of sodium hydroxide, potassium hydroxide, sodium carbonate, potassium carbonate and mixtures thereof, while maintaining the pH of the solution effluent from said first sorption zone at not greater than 6 and maintaining the temperature of the gaseous mixture at not greater than 100°F while passing through said sorption zone so as to selectively remove hydrogen fluoride from the gaseous mixture and form a soluble fluoride salt in said first aqueous solution;
   b. recovering said first aqueous solution together with fluoride dissolved therein as a liquid effluent from said first sorption zone;
   c. diverting a large portion of about 50–90 percent of said liquid effluent while passing the remaining portion to a reaction vessel for reaction with calcium hydroxide;
   d. neutralizing a portion of about 50–90 percent of the fluoride introduced into the reaction vessel by the addition of calcium hydroxide to precipitate calcium fluoride and regenerate a hydroxide solution;
   e. separating the liquid and precipitate from said reaction vessel by mechanical means and recovering a solids-free hydroxide solution;
   f. mixing said recovered, solids-free hydroxide solution with said diverted large portion of said liquid effluent from said first sorption zone;
   g. recycling said mixed solution as the aqueous solution for said first sorption zone;
   h. recovering said gaseous mixture from said first sorption zone substantially free of hydrogen fluoride and passing it through a second sorption zone in crossflow contact with a second aqueous solution of a basic compound selected from the group consisting of sodium hydroxide, potassium hydroxide, sodium carbonate, potassium carbonate and mixtures thereof, while maintaining the pH of the solution effluent from said second scrubbing bed at between 6 and 13 so as to selectively remove sulfur dioxide from the gaseous mixture and form a soluble sulfite salt in said second aqueous solution; and,
   i. recovering said gaseous mixture substantially free of both hydrogen fluoride and sulfur dioxide.

2. The process of claim 1 additionally comprising the step of cooling said diverted large portion of said liquid effluent from said first sorption zone to a temperature below about 100°F, prior to mixing said diverted large portion of said liquid effluent with said recovered, solids-free hydroxide solution.

3. The process of claim 1 wherein said first aqueous solution of a basic compound is initially a solution of sodium hydroxide.

4. A process for the selective and separate removal of hydrogen fluoride and sulfur dioxide from a gaseous mixture comprising the steps of:
   a. passing said gaseous mixture through a first sorption zone in crossflow contact with a first aqueous solution of a basic compound selected from the group consisting of sodium hydroxide, potassium hydroxide, sodium carbonate, potassium carbonate and mixtures thereof, while maintaining the pH of the solution effluent from said first sorption zone at not greater than 6 and maintaining the temperature of the gaseous mixture at not greater than 100°F while passing through said sorption zone so as to selectively remove hydrogen fluoride from the gaseous mixture and form a soluble fluoride salt in said first aqueous solution;
   b. recovering said gaseous mixture substantially free of hydrogen fluoride and passing it through a second sorption zone in crossflow contact with a second aqueous solution of a basic compound selected from the group consisting of sodium hydroxide, potassium hydroxide, sodium carbonate, potassium carbonate and mixtures thereof, while maintaining the pH of the solution effluent from said second scrubbing bed at between 6 and 13 so as to selectively remove sulfur dioxide from the gaseous mixture and form a soluble sulfite salt in said second aqueous solution;
   c. recovering said second aqueous solution together with sulfite dissolved therein as a liquid effluent from said second sorption zone;
   d. diverting a large portion of about 50–90 percent of said liquid effluent while passing the remaining portion to a reaction vessel for reaction with calcium hydroxide;
   e. neutralizing a portion of about 50–90 percent of the sulfite introduced into the reaction vessel by the addition of calcium hydroxide to precipitate calcium sulfite and regenerate a hydroxide solution;
   f. separating the liquid and precipitate from said reaction vessel by mechanical means and recovering a solids-free hydroxide solution;
   g. mixing said recovered, solids-free hydroxide solution with said diverted large portion of said liquid effluent from said second sorption zone;
   h. recycling said mixed solution as the aqueous solution for said second sorption zone; and, i. recovering said gaseous mixture substantially free of both hydrogen fluoride and sulfur dioxide.

5. The process of claim 4 wherein said second aqueous solution of a basic compound is initially a solution of sodium hydroxide.

6. The process of claim 1 additionally comprising the steps of:
   a. recovering said second aqueous solution together with sulfite dissolved therein as a liquid effluent from said second sorption zone;
   b. diverting a large portion of about 50–90 percent of said liquid effluent while passing the remaining portion to a reaction vessel for reaction with calcium hydroxide;
   c. neutralizing a portion of about 50–90 percent of the sulfite introduced into the reaction vessel by the addition of calcium hydroxide to precipitate calcium sulfite and regenerate a hydroxide solution;
   d. separating the liquid and precipitate from said reaction vessel by mechanical means and recovering a solids-free hydroxide solution;
   e. mixing said recovered, solids-free hydroxide solution with said diverted large portion of said liquid effluent from said second sorption zone; and,
   f. recycling said mixed solution as the aqueous solution for said second sorption zone.

7. The process of claim 6 wherein said first aqueous solution of a basic compound and said second aqueous solution of a basic compound are both initially solutions of sodium hydroxide.

8. In a process for the removal of hydrogen fluoride from a gaseous mixture by contact with an aqueous solution of a basic compound so as to form a soluble fluoride salt therein wherein said solution containing dissolved fluoride salt is recovered and reacted with calcium hydroxide to precipitate calcium fluoride and regenerate the basic solution for recirculation, the improvement which comprises:
   a. diverting a large portion of about 50–90 percent of said recovered solution containing fluoride salt while passing the remaining portion to a reaction vessel for reaction with calcium hydroxide;
   b. neutralizing a portion of about 50–90 percent of the fluoride introduced into the reaction vessel by the addition of calcium hydroxide to precipitate calcium fluoride and regenerate a hydroxide solution;
   c. separating the liquid and precipitate from said reaction vessel by mechanical means and recovering a solids-free hydroxide solution;
   d. mixing said recovered, solids-free hydroxide solution with said diverted large portion of said recovered solution containing fluoride salt; and,
   e. recycling said mixed solution as said basic solution for contact with said gas stream.

9. In a process for the removal of sulfur dioxide from a gaseous mixture by contact with an aqueous solution of a basic compound so as to form a soluble sulfite salt therein wherein said solution containing dissolved sulfite salt is recovered and reacted with calcium hydroxide to precipitate calcium sulfite and regenerate the basic solution for recirculation, the improvement which comprises:
   a. diverting a large portion of about 50–90 percent of said recovered solution containing sulfite salt while passing the remaining portion to a reaction vessel for reaction with calcium hydroxide;
   b. neutralizing a portion of about 50–90 percent of the sulfite introduced into the reaction vessel by the addition of calcium hydroxide to precipitate calcium sulfite and regenerate a hydroxide solution;
   c. separating the liquid and precipitate from said reaction vessel by mechanical means and recovering a solids-free hydroxide solution;
   d. mixing said recovered, solids-free hydroxide solution with said diverted large portion of said recovered solution containing sulfite salt; and,
   e. recycling said mixed solution as said basic solution for contact with said gas stream.

* * * * *

UNITED STATES PATENT AND TRADEMARK OFFICE
CERTIFICATE OF CORRECTION

PATENT NO. : 3,919,392
DATED : November 11, 1975
INVENTOR(S) : Aaron Joseph Teller It is certified that error appears in the above-identified patent and that said Letters Patent are hereby corrected as shown below:

Col. 2, lines 53-53 - delete "$SO_2^=$" and insert -- $SO_2$ --.

Col. 2, lines 53-54 - delete "$SO_3^-$" and insert -- $SO_3^=$ --.

Col. 3, lines 36-37 - delete "$SO_2^=$" and insert -- $SO_3^=$ --.

Signed and Sealed this thirteenth Day of April 1976

[SEAL]

Attest:

RUTH C. MASON
Attesting Officer

C. MARSHALL DANN
Commissioner of Patents and Trademarks